Feb. 21, 1967 D. L. BURDORF ETAL 3,305,186

TAPE TRANSPORT SYSTEM USING A DRIVE BELT CONTACTING TAPE PACKS

Filed April 18, 1963 6 Sheets-Sheet 1

INVENTORS.
DONALD L. BURDORF
JAMES T. BLAKISTONE
BY Lyon & Lyon
ATTORNEYS

Feb. 21, 1967 D. L. BURDORF ET AL 3,305,186

TAPE TRANSPORT SYSTEM USING A DRIVE BELT CONTACTING TAPE PACKS

Filed April 18, 1963 6 Sheets-Sheet 2

INVENTORS.
DONALD L. BURDORF
JAMES T. BLAKISTONE
BY Lyon & Lyon
ATTORNEYS

TAPE TRANSPORT SYSTEM USING A DRIVE BELT CONTACTING TAPE PACKS

Filed April 18, 1963 6 Sheets-Sheet 3

INVENTORS.
DONALD L. BURDORF
JAMES T. BLAKISTONE
BY Lyon & Lyon
ATTORNEYS

INVENTORS.
DONALD L. BURDORF
JAMES T. BLAKISTONE
BY [signature]
ATTORNEYS

TAPE TRANSPORT SYSTEM USING A DRIVE BELT CONTACTING TAPE PACKS

Filed April 18, 1963

INVENTORS.
DONALD L. BURDORF
JAMES T. BLAKISTONE
BY Lyon & Lyon
ATTORNEYS

TAPE TRANSPORT SYSTEM USING A DRIVE BELT CONTACTING TAPE PACKS

Filed April 18, 1963

6 Sheets-Sheet 6

INVENTORS.
DONALD L. BURDORF
JAMES T. BLAKISTONE
BY [signature]
ATTORNEYS

United States Patent Office 3,305,186
Patented Feb. 21, 1967

3,305,186
TAPE TRANSPORT SYSTEM USING A DRIVE BELT CONTACTING TAPE PACKS

Donald L. Burdorf, Arcadia, and James T. Blakistone, Pasadena, Calif., assignors to Kinelogic Corporation, Pasadena, Calif., a corporation of California Filed Apr. 18, 1963, Ser. No. 273,941
29 Claims. (Cl. 242—55.12)

The present invention relates to means and techniques useful in transporting a web and is particularly useful in information-recording/reproducing systems wherein, for example, a magnetic tape is transported from a supply reel pack to a takeup reel pack, and vice versa.

Transferring magnetic tape from one reel to another at essentially constant velocity and constant tension is usually a basic requirement for any high quality instrumentation type magnetic recorder. Essentially, constant velocity is the equivalent of very low flutter, which is highly desirable if distortion (spurious frequency generation) is to be avoided. The need or desirability for constant tape tension, however, is not so apparent. For example, some flutter components are dependent upon variations in tape tension. Tape tracking and guidance, effective bias level on the tape during direct type recording, playback level, head wear, drop-outs, etc., are influenced by variation in tape tension. Difficult problems are encountered, however, in eliminating variations in tape tension. The difficulty stems mainly from the fact that the diameter of each tape reel is constantly changing. To achieve constant tape velocity, the conventional approach is to insert one or two capstans between the tape reels to provide metering of the tape. Tape tension controls run the gamut from constant torque braking and take-up of the reels to very sophisticated servo systems. The more precise systems use either reel servos or the equivalent of a dual capstan drive. In a system employing dual capstans or their equivalent, tape tension is generated primarily by the two capstans and reel torques are reduced to as low a value as practical. Variations in the reel torques are, therefore, relatively small when compared to the tension generated by the capstans.

Also, most reel-to-reel tape deck machines use center driven reel hubs. The basic speed variation problem is often accommodated through the use of an over-running clutch on the lead reel and a brake on the following reel. Individual opposed torque motors on supply and take-up spools are also used. These arrangements are wasteful of energy and mechanically complex.

Other techniques include differentially coupling supply and take-up reel through negator springs. This latter approach finds considerable favor in low power satellite recorders, but requires a separate capstan system and also is rather complicated mechanically.

In an ideal system, no power would be required to transfer tape from one reel to another under a stated constant tension and the tape reels would be driven such that the linear velocity and the tension of the tape between the reels would be constant from the beginning to the end of the reel. The transducer heads would be the only elements in contact with the tape during the transfer of the tape from one reel to another, thus reducing the number of flutter generating elements to a minimum.

The systems described herein closely approach this ideal system. The reels are driven by a pretensioned seamless elastic drive belt, one section of which contacts the outer layer of the web as wound upon one of the two reels; and a second section of which contacts the outer layer of the web as wound upon the second of two reels, the belt when driven incurring substantially no slippage on the reels and the belt being so driven as to produce an increase in tension in one of its above mentioned sections and a reduction in tension in the other one of such sections, the effect of which is to generate constant force in the tape section between the reels as the tape is moved from reel to reel at substantial constant speed when and as the tape reels change in diameter and in rotational speed, the entire system having a minimal power requirement.

A general object of the present invention is to provide a system of the character indicated above and to obviate the above indicated disadvantages in prior art systems.

A specific object of the present invention is to provide a tape transport drive system of this character which eliminates the necessity of take-up and hold-back motors with their associated control systems for control of tape tension.

Another specific object of the present invention is to provide a system of this character which is mechanically simple and reliable and operates with extremely low power, affords a large saving in weight and space, and provides complete bi-directional capability while, at the same time, having improved wow and flutter characteristics.

Another specific object of the present invention is to provide a system of this character which may not require capstan rollers for driving the tape directly, while, at the same time, provides excellent transducer head to tape contact as well as relatively low wow and flutter.

Another specific object of the present invention is to provide a system of this character in which only a single low-power drive motor is required.

Another specific object of the present invention is to provide a system of this character having sufficiently acceptable wow and flutter and constant tape tension characteristics in a small portable low powered recorder/reproducer.

Another specific object of the present invention is to provide a system of this character wherein low driving power requirements, constant speed and constant tape tension capability is achieved by using a seamless elastic drive belt of Mylar or polyurethene for example, contacting portions of the tape take-up pack and tape supply pack and being driven in a unique manner to achieve differential tensions in different sections of the belt.

Another specific object of the present invention is to provide a system of this character wherein a pretensioned elastic belt passes over two capstans with substantially no slipping thereon, two different sections contacting a take-up tape pack and a supply tape pack, respectively, also without slipping thereon, and with the peripheral speeds of the capstans being different to provide differential tensions in different belt sections, the peripheral speed of the fast capstan ranging from approximately a few tenths of a percent faster to several percent faster than the slow capstan, the specific percentage difference being dependent upon the elastic properties of the specific belt and the desired web tension.

Another specific object of the present invention is to provide a system of this character in which the elasticity of the tape, tape packs and tape contacting and driving belt contribute in achieving a system, dynamically self balancing, so as to eliminate belt slippage either at capstans or at contacting surfaces between tape and belt and yet provide differential tensions in the belt properly directed to assure, at all times, substantially constant tape speed and tension between tape packs.

Another specific object of the present invention is to provide a system of this character in which the power required to maintain tension between reels is transferred from supply reel to take-up reel by means of the reel drive belt and its interconnected driving capstans and results in a substantially zero net power input requirement for the system.

Another specific object of the present invention is to provide a system of this character having as one of its features the absence of reel brakes, clutches, motors, springs, etc., which constitute a large percentage of the moving parts in a conventional recorder, thereby also achieving a considerably higher degree of reliability, which is so important in instrumentation recorders.

Another specific object of the present invention is to provide a system of this character which may have as one of its features—flangeless tape reels.

Another specific object of the present invention is to provide a system of this character which allows the rotational axes of the reels to be closer to each other to achieve greater compactness.

Another specific object of the present invention is to provide a system of this character wherein tape tension between tape reels is determined substantially only by the difference in peripheral speeds of two capstans driving a belt which engages the two reels and the physical characteristics of this belt itself (its cross-sectional area and tensile modulus).

Another specific object of the present invention is to provide a system of this character wherein the drive characteristics of the system are not dependent upon specific frictional forces, the only requirement in that regard being that the belt is sufficiently pretensioned to insure substantially non-slip operation.

Another specific object of the present invention is to provide a system of this character wherein there is excellent tape guidance and skew control through improved tape stacking.

Another specific object of the present invention is to provide a system of this character wherein braking problems are eased because the supply and take-up reels are in effect mechanically connected by a drive belt engaging the reels peripherally with starting, stopping, and running forces applied to the drive belt being immediately transmitted to both the supply and take-up reels by the single drive belt.

Another specific object of the present invention is to provide a system of this character wherein a constant tension reel to reel transfer is derived from a seamless tape pack drive belt and its interconnected capstans, it being possible to establish web movement and tension by the application of power to any point in the system such as, for example, to the drivebelt or the web.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figures 3, 4:
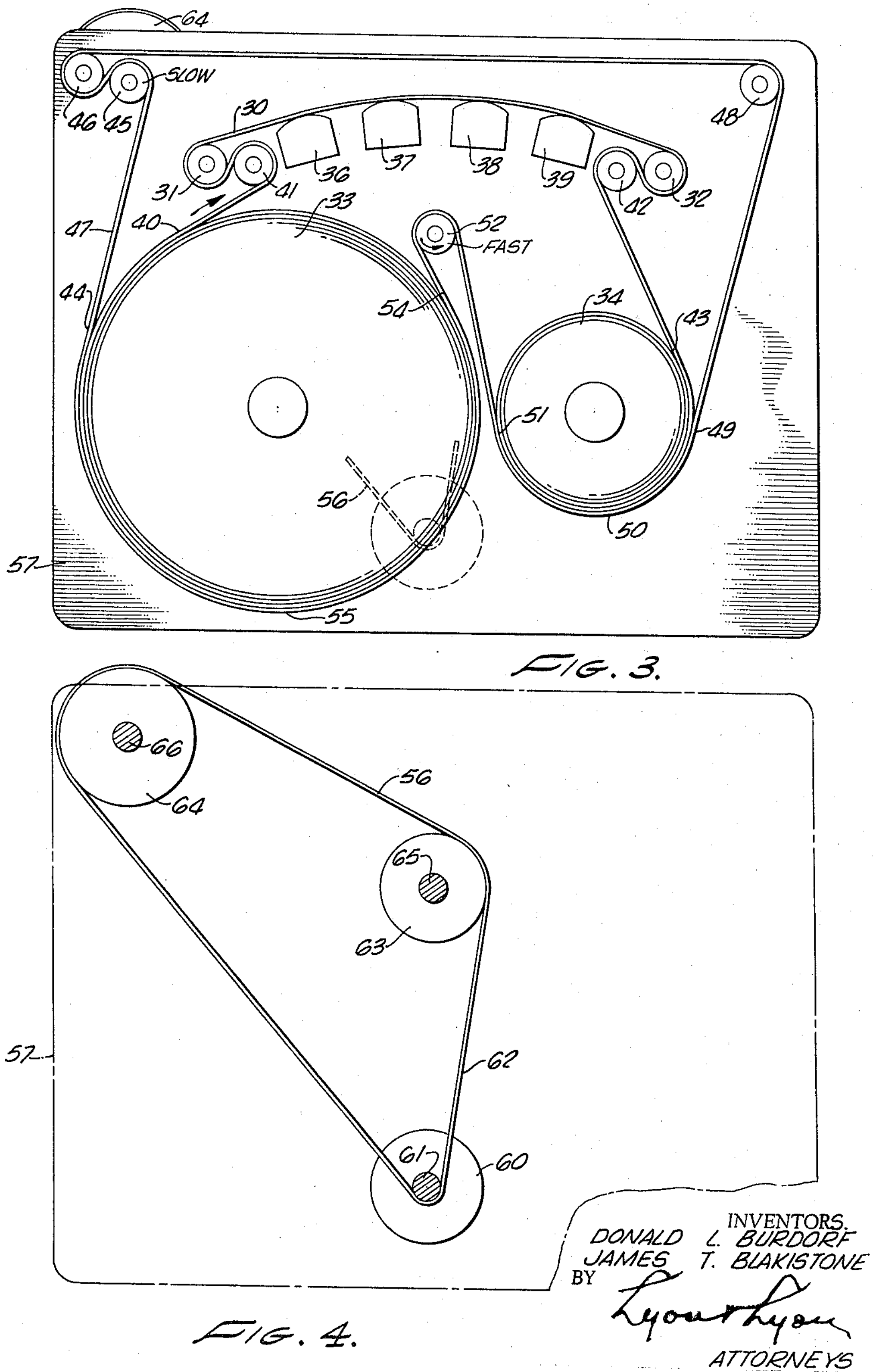

FIGURE 3 serves to illustrate certain forms of the present invention with or without capstans engaging the magnetic tape.

FIGURE 4 serves to illustrate the below-deck drive system for the arrangement shown in FIGURE 3 when no tape capstans are used.

Figure 5:
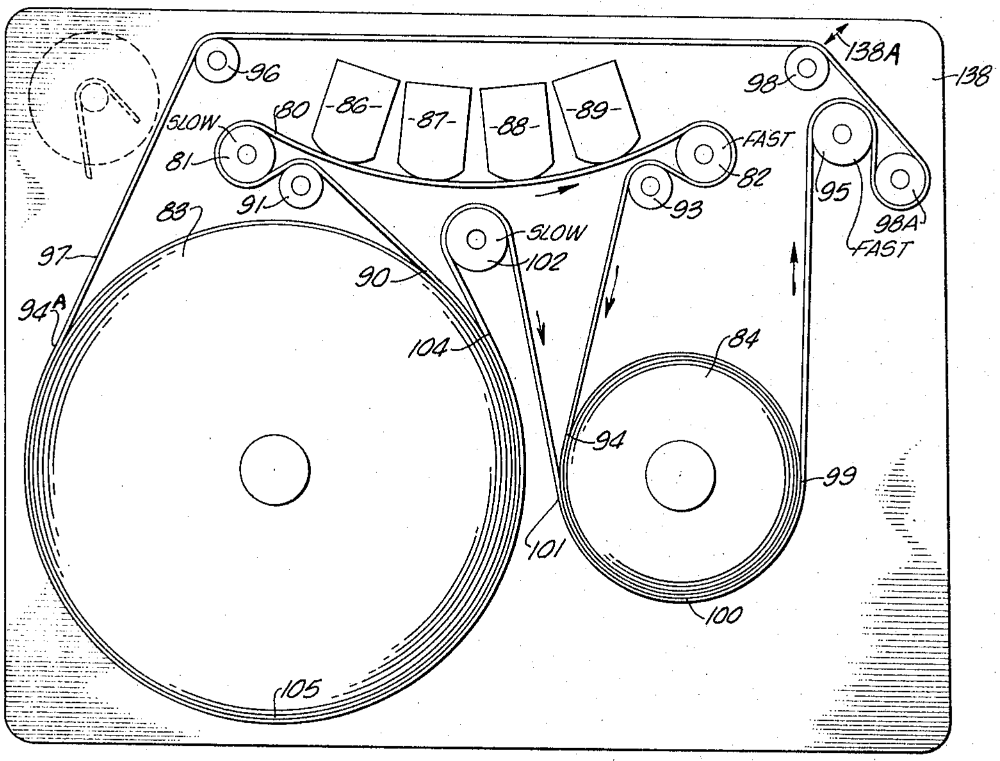

FIGURE 5 serves to illustrate other forms of the present invention.

Figure 6:
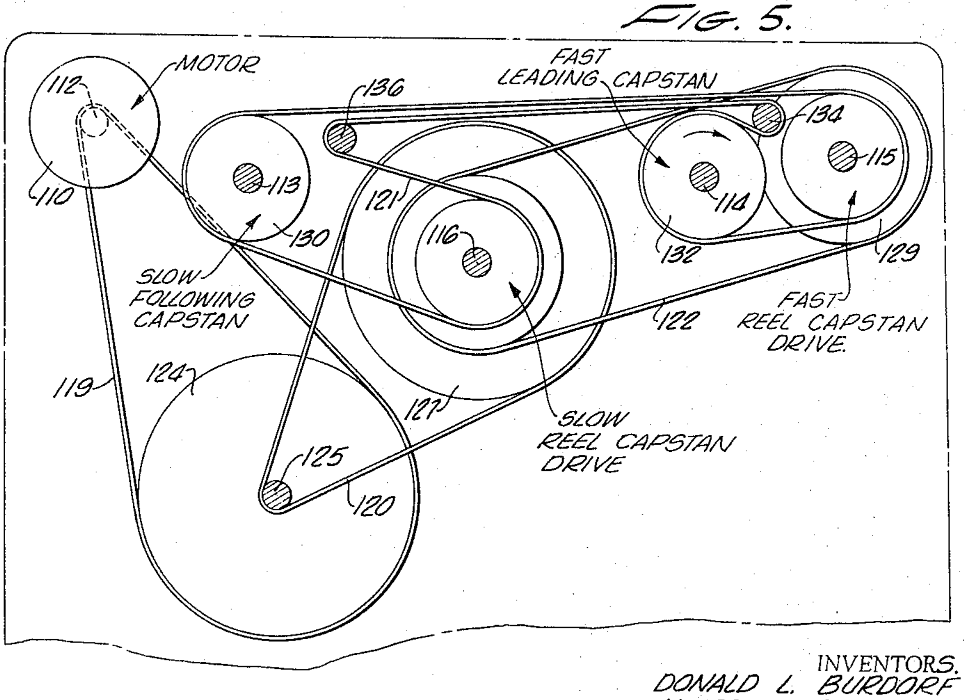

FIGURE 6 serves to illustrate an arrangement for driving capstans in one form of the invention described in connection with FIGURE 5.

Figure 9:
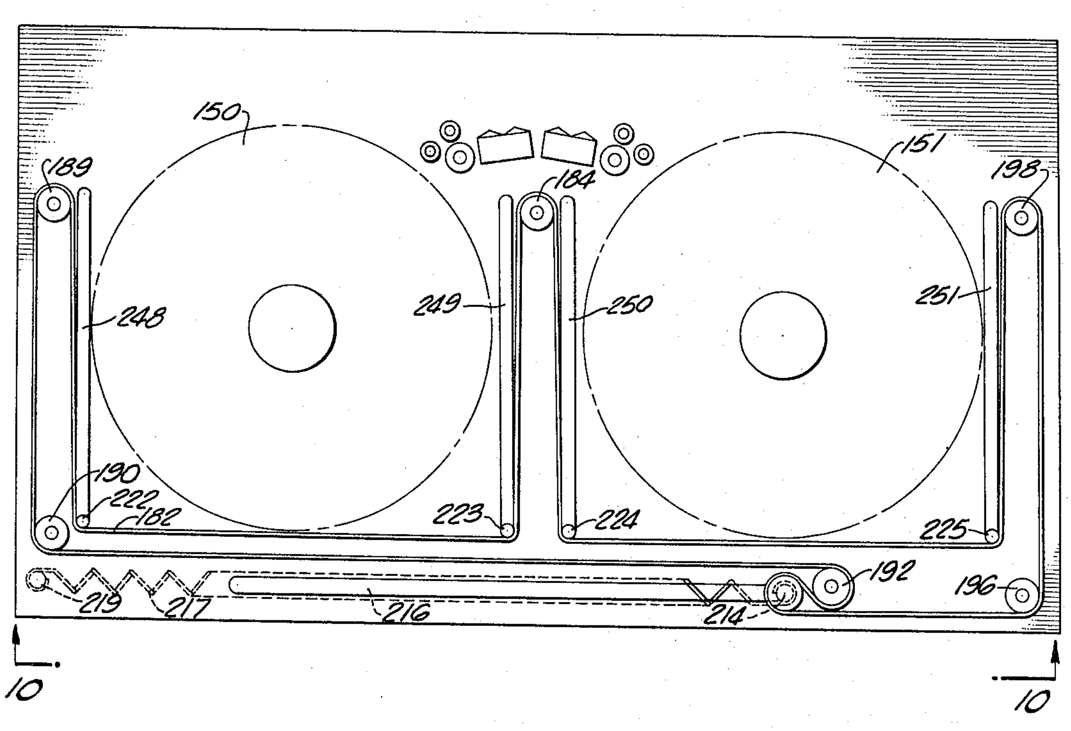
Figures 7, 8:
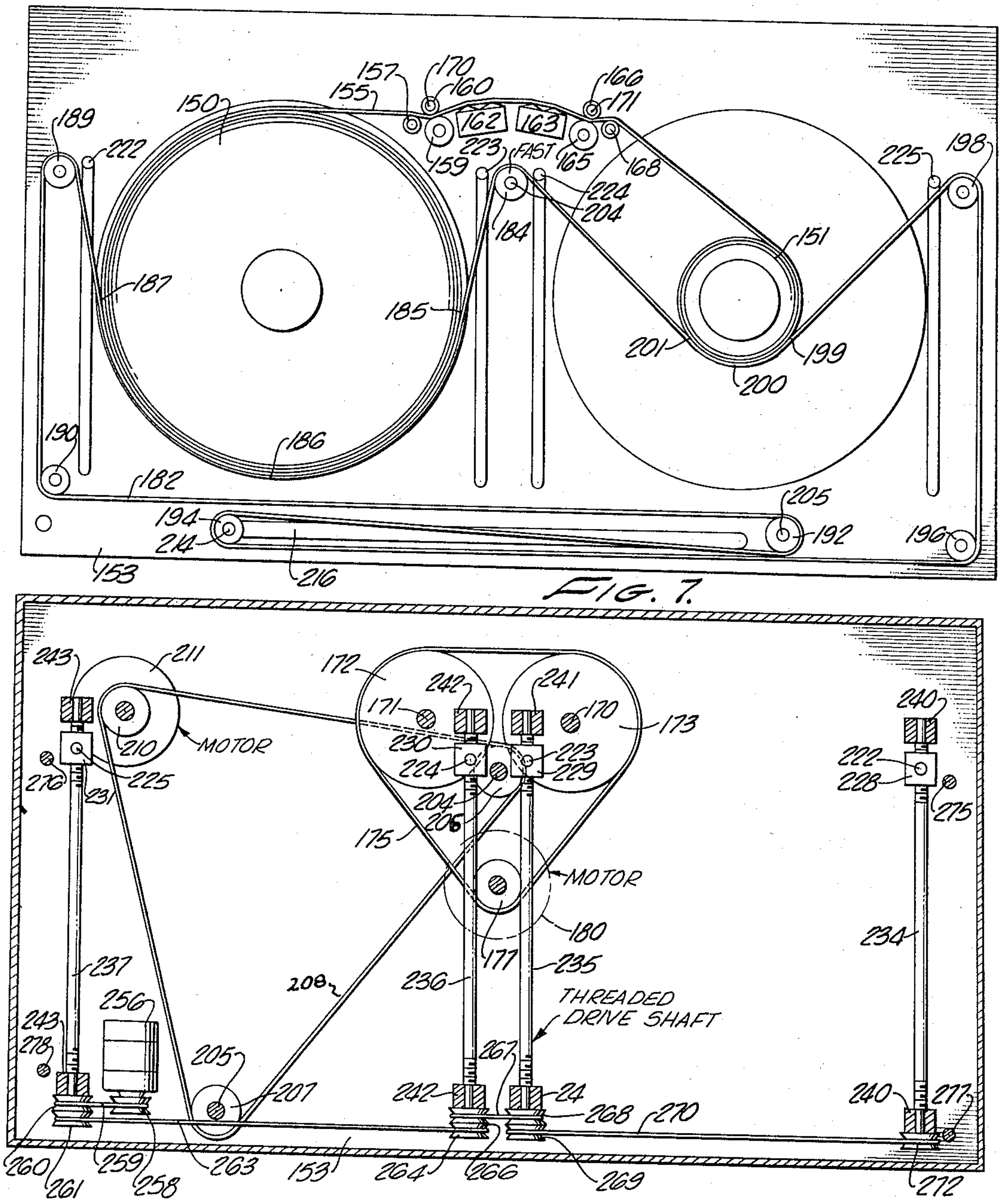

FIGURES 7 to 10 serve to illustrate other arrangements in accordance with the present invention; FIGURE 7 being a top plan view; FIGURE 8 showing substantially the underside of the arrangement; FIGURE 9 being a view like that in FIGURE 7, but with elements on a different position; and FIGURE 10 being a view taken substantially in the direction indicated by arrows 10—10 in FIGURE 9.

Figures 11, 19:
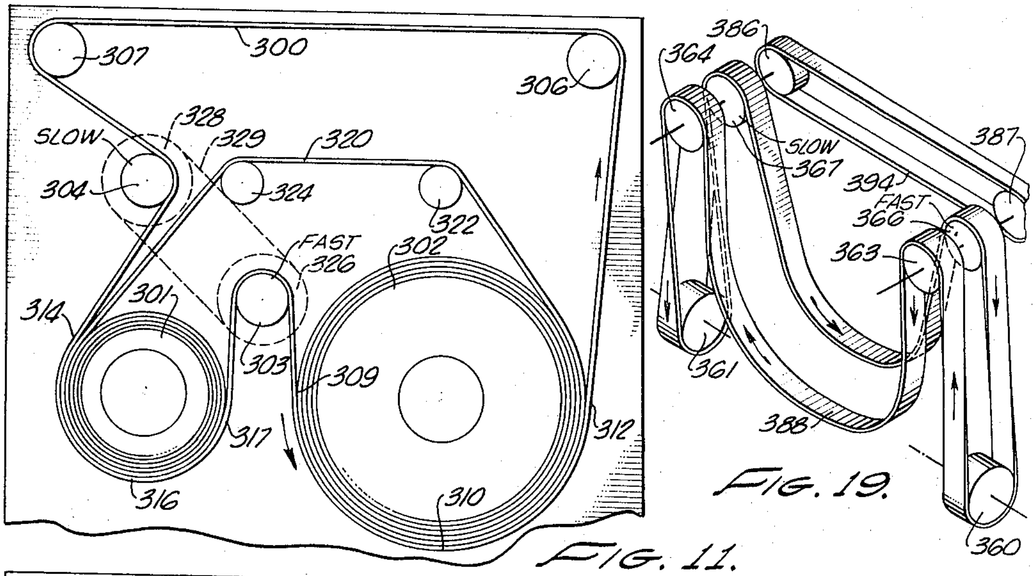
Figure 12:
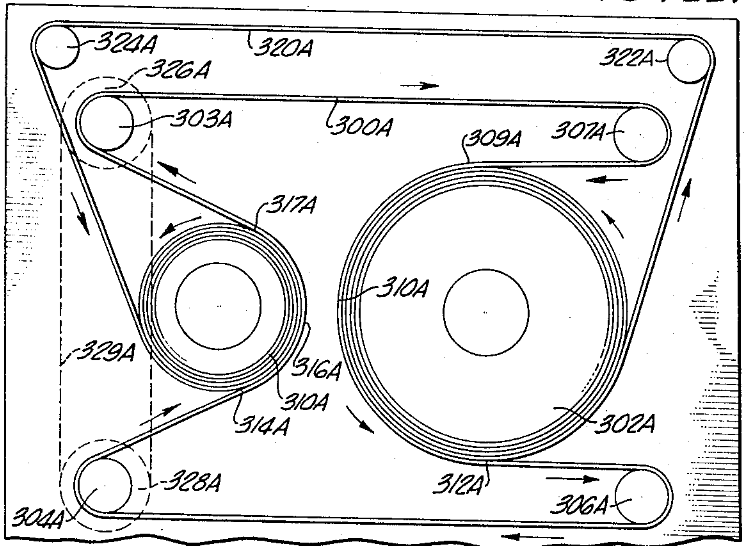
Figure 13:
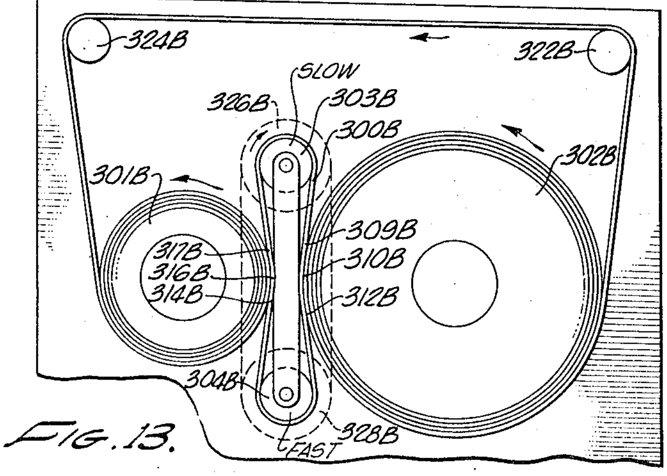

FIGURES 11, 12, 13, serve to illustrate three other arrangements, each embodying features of the present invention.

Figures 14, 15, 16, 17, 18:
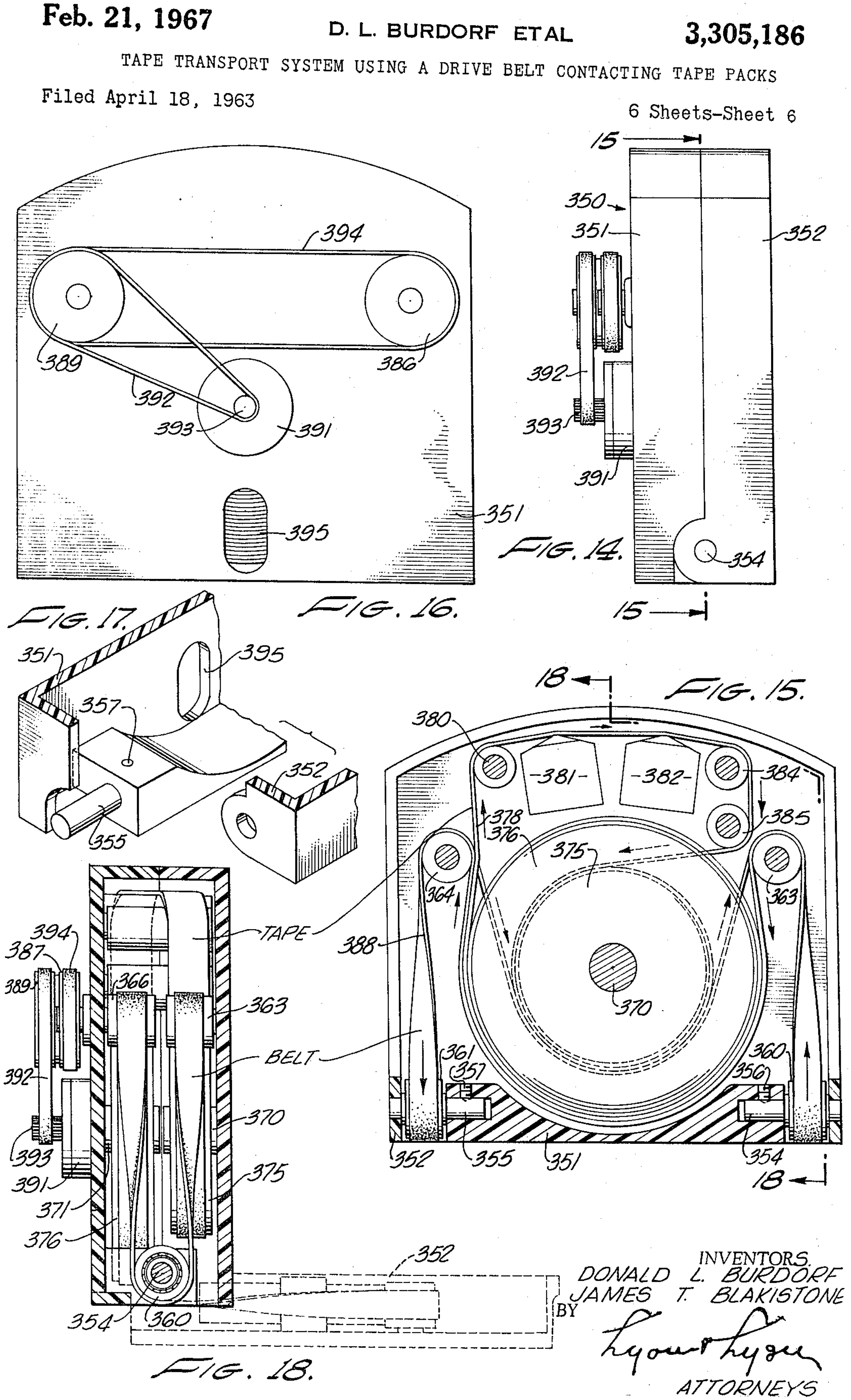

FIGURES 14 to 19 pertain to another arrangement in accordance with the present invention: FIGURE 14 being a view in side elevation; FIGURE 15 being a view taken substantially as indicated by the arrows 15—15 in FIGURE 14; FIGURE 16 being a view in rear elevation; FIGURE 17 being a perspective view showing some of the elements in disassembled form; FIGURE 18 being a view taken substantially as indicated by arrows 18—18 in FIGURE 15; and FIGURE 19 being a perspective view illustrating the disposition of the driving belt.

Figure 1:
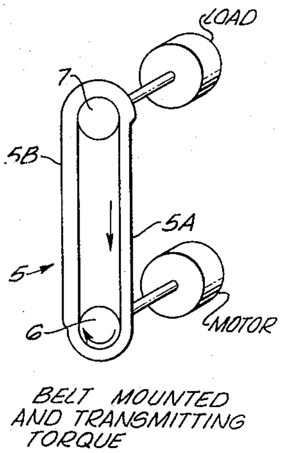
FIGURE 1 is useful in explaining certain actions taking place in the arrangements shown in the succeeding figures.

FIGURE 1 serves as background material and is helpful in an understanding and explanation of certain actions taking place in the system described in connection with subsequent figures, and serves to illustrate in an exaggerated form, the shape assumed by a pretensioned elastic belt 5 when and as it transmits torque between a motor-driven pulley 6 and pulley 7 on a shaft driving the indicated load without slippage of the belt 5 at either one of the two pulleys 6, 7. When the initial tension is sufficient to prevent belt-pulley slippage, the difference in the tensions in the two belt sections 5A and 5B between the two pulleys transmits the torque and the additional force present in the tight side 5A of the belt results in further elongation and reduction in cross-sectional area, while the reduction of tension in the slack side results in further contraction and increase in area on the slack side 5B as indicated in FIGURE 1. It is noted that, as to belt section 5A under the force imposed by the load, essentially no elongation takes place until the belt comes free of the load pulley 7, nor does the contraction of the belt section 5B on the slack side occur until the belt leaves the motor-driven pulley 6. This is due to the significant fact that the belt is originally (in the absence of any driven load; i.e., in the static condition of the system) under sufficient pretension to drive the driven load without slippage on the pulleys.

Since the belt mass passing a given point anywhere in the belt system per unit of time must be constant for a condition of equilibrium, it follows that the linear speed of a point on the belt on its tight side 5A must be greater than that of a point on its slack side 5B. Thus a belt under load can run without slip while having its load and no-load sides running at different linear speeds.

Figures 2, 10:
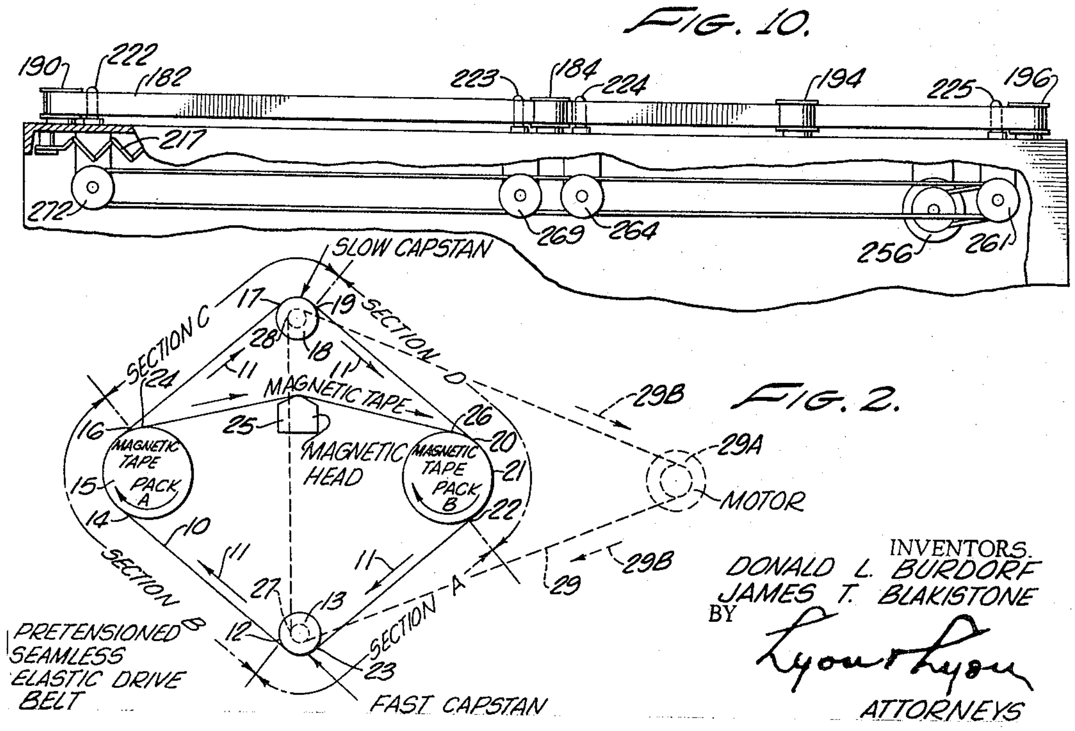
FIGURE 2 illustrates a generalized form of the present invention.

These principles and actions involved in a pretensioned non-slipping belt are incorporated in the generalized form of the present invention now described in connection with FIGURE 2, with particular emphasis on that particular pretensioned seamless elastic drive belt 10 which, as indicated by the arrows 11 leaves point 12 on a fast capstan 13 and passes in turn, to an initial point 14 of an engagement on the magnetic tape pack A, past point 15 thereon, leaves pack A at point 16, passes to an initial point 17 of engagement in slow capstan 18, leaves capstan 18 at point 19 thereon, passes to the initial point of engagement 20 on magnetic tape pack B, passes point 21 thereon, leaves pack B at point 22 and returns to capstan 13 at point 23 thereon.

It will be seen that the section of belt 10 between points 22 and 12 is designated as section A, and likewise, the belt section between points 12 and 16 is section B, the section of belt between points 16 and 19 is section C, and the section of belt between points 19 and 22 is section D.

The magnetic tape on pack A leaves the pack at point 24, travels over the magnetic transducer head 25, and enters the pack B at point 26.

As alluded to previously, the capstan 13 is a fast capstan and capstan 18 is a slow capstan, which means that the peripheral speeds of their belt-engaging surfaces or peripheries are so related that the peripheral speed of capstan 13 is greater than the peripheral speed of capstan 18 and this is accomplished by driving pulleys 27, 28 on the same shaft as capstans 13 and 18, respectively, by a belt 29 passing over these pulleys and a motor-driven shaft 29A such that the belt 29 travels in the direction indicated by arrows 29B, whereby the peripheral speed of capstan 13 is in the case of a Mylar belt approximately a few tenths of a percent faster than the peripheral speed of the slow capstan 18.

The pretension in the two belts 10, 29 (the condition when the system is static) is such that during magnetic tape movement (the condition when the system is dynamic) substantially no belt slippage occurs at any one of the pulleys or at the motor shaft or between belt 10 and the tape packs engaged thereby. For purposes of this discussion, belt 29 is essentially inelastic.

Pack B under the conditions illustrated is the tape take-up pack and pack A is the tape supply pack. The difference in surface speed between the fast capstan 13 and slow capstan 18 tends to elongate the tape drive belt 10 in sections A and D. This elongation occurs because belting tends to be removed by the fast capstan faster in sections A and D than it is paid out by the slow capstan 18, causing belt stretching and reduction in belt cross-section, with the net result that there tends to be a higher linear speed and greater tension in the areas of sections A and D. By the same token, the fast capstan 13 tends to pay out belting into sections B and C faster than it is being removed by the slow capstan 18 from these sections. The difference in capstan speeds thus results in conditions akin to those described above in connection with FIGURE 1.

Due to the fact that the belts 10 and 29 are coupled in non-slip fashion to magnetic tape packs A and B which are, themselves, interconnected by the magnetic tape, the tendency of belting in section D to run faster and of belting in section B to run slower, is neutralized by tension developed in the magnetic tape which effects an elongation and reduction of cross section in section B and permits a contraction and increase in cross section in section D.

Reversal of tape motion and reeling conditions is accomplished by merely reversing the direction of rotation of the motor-driven shaft 29A, thus providing complete bi-directional performance.

A consideration of the effect of motor reversal shows that section C and section B now tend to be elongated while section D and section A tend to contract. Thus the positions of the slack and tight sides of the belt are interchanged with motor reversal and a tape tension in the web is developed which opposes the tendency of section C to elongate and section A to contract under these conditions.

Power requirements are extremely low, the major portion being used to overcome bearing friction and magnetic tape-to-head friction.

The arrangement shown in FIGURES 3 and 4 effects a tension in the tape 30 in the transducer head area between rollers 31 and 32 as the tape moves from the supply reel 33 to the take-up reel 34.

The tape 30 travels over four transducer heads 36, 37, 38 and 39 in this area. The magnetic tape path is from the supply reel 33 where it leaves at point 40, around idler roller 41, past the capstan roller 31, across the head area around tape-drive capstan 32, past idler roller 42 to the take-up pack at point 43. The path of the elastic belt reel drive, which is an endless belt 47 of, for example, Mylar, is from the point 44 on the tape spool, to slow capstan 45, around the idler roller 46 to idler roller 48 to the take-up pack at point 49, around the take-up pack past points 50 and 51 where it leaves the take-up tape pack, to fast belt drive capstan 52 and thence back to the supply pack at point 54, around the supply pack to points 55 and return point 44.

The lineal speed of the recording tape 30, where it leaves the supply reel at 40, where it crosses the transducer head area and where it reaches the take-up pack at 43, is equal and constant. The tape pack belt 47 provides a take-up tension in the recording tape between roller 32 and the point 43 and a dragging tension in the recording tape section between idler 41 and the point 40 where the tape leaves the supply reel. These tensions about the roller 31 and 32 assure proper slip-free mechanical coupling between the magnetic tape and rollers 31 and 32 which may be used to regulate and stabilize the tape speed in the transducer head area.

The firm coupling of the tape to the rollers 31 and 32 is assured by adequate wrap-around due to the relative position of rollers 41 and 42 to rollers 31 and 32, respectively. This wrapping of tape in conjunction with the tape pack belt generated tensions effectively couples the magnetic tape to the rollers 31, 32 without slip. In this manner, the energy loss characteristic of the pinch roll drives is avoided.

For purposes of developing the take-up and supply tension, capstan 52 is a capstan driven at a speed slightly greater than the tape speed and capstan 45 is a capstan driven slightly less than tape speed. All four drive capstans 52, 31, 45, and 32 may be driven from a single driving belt below the supporting plate or deck 57 and which travels over a motor-driven pulley and pulleys of proper diameters on the capstan shafts to produce the above described relations in capstan speeds, as shown in FIGURE 6.

The order of magnitude of speed difference between fast-belt capstan 52 and slow-belt capstan 45 for a desired web tension is established by the elastic properties of the endless tape pack belt 47 which actually provides the tensions being discussed, as well as the elastic properties and condition of the magnetic recording tape itself.

Thus, under the stated conditions with fast capstan 52 running counterclockwise in FIGURE 3 at a slightly higher speed than slow-belt drive capstan 45 and the magnetic tape 30 running from left to right over the transducer heads at a speed between the peripheral velocities of the two belt drive capstans 52, 45 and with the tape pack belt 47 under pretension, the following relationships exist.

In the section of the endless tape pack drive belt 47 between slow belt drive capstan 45 and fast belt drive capstan 52 contacting tape pack 34 there is a continuing stretching of the tape pack drive belt 47 due to the relative difference in speeds of these two capstans. This stretching means that the section of the belt 47 between point 51 and capstan 52 has a slightly higher lineal speed than the magnetic tape which is being paid off idler 42 at that constant speed established by the tape drive capstans 32 and 31. The net result is that while the belt 47 is trying to develop a slightly higher lineal speed along its entire path from capstan 45 over the take-up pack 34 to capstan 52, the tape 30 connecting take-up pack 34 with supply pack 33 opposes the tendency of belt 47 to run faster in the take-up side section between capstan 45 and point 49. Since the forces involved do not allow the take-up reel tape to slip, the magnetic tape between capstan 32 and point 43 is placed under sufficient tension to equalize the lineal speeds of tape 30 at point 43 and belt 47 at point 49.

Summarizing, tape take-up tension is developed as a result of a balance of elastic forces in which the tendency of tape pack belt 47 to run faster from slow belt capstan 45 to point 49 (which would wind the take-up pack at the slightly higher tape pack drive belt speed) is opposed by the restraining influence of the slower magnetic tape 30 which is thus subjected to a tension causing it to equalize velocities.

In the section of the tape pack drive belt 47 between fast belt drive capstan 52 and slow belt drive capstan 45 contacting tape pack 33, there is a continuing contraction of the tape pack drive belt 47 due to the relative difference in speeds of these two capstans. This contraction means that the section of the belt 47 between point 44 and capstan 45 has a slightly lower lineal speed than the magnetic tape 30 which is being taken up on idler 41 at that constant speed established by the tape drive systems 31 and 32. The net result is that while the belt 47 is tending to run at a slightly lower lineal speed along its entire path from capstan 52 over the supply pack 33 to capstan 45, the tape 30 connecting the supply pack 33 to the take-up pack 34 opposes the tendency of belt 47 to run slower in the supply side section between capstan 52 and point 44. Since the forces involved do not allow the supply reel tape to slip, the magnetic tape between capstan 31 and point 40 is placed under sufficient tension to equalize the lineal speeds of tape 30 at point 40 and belt 47 at point 54.

Summarizing, tape supply tension is developed as a result of a balance of elastic forces in which the tendency of tape pack belt 47 to run slower from fast belt capstan 52 to point 54 (which would wind the take-up pack at the slightly lower tape pack drive belt speed on its supply side) is opposed by the pulling influence of the faster magnetic tape 30 which is thus subjected to a tension causing it to equalize velocities.

Thus there is provided predictable tape tension by a self equalization of stresses and strains in the elastic drive system. The system comes into dynamic elastic equilibrium, free of slippage, with the only significant energy required to be supplied to the system being that to overcome bearing and tape-to-tape head friction losses.

In the foregoing description, capstans 31 and 32, each of the same diameter, may both be driven at the same speed, which is a speed lower than that of the peripheral speed of fast capstan 52 and higher than that of the peripheral speed of capstan 45, with the peripheral speeds of capstans 52 and 45 differing by a fraction of one percent in the case of a Mylar belt. Tests show that a constant speed can be imparted to tape 30 in the transducer head area by the tape belt 47 being driven by such capstans 52, 45 without driving force applied to the rollers 31, 32, this being due to the belt's elastically self-equalizing speed characteristic. It is thus possible to use rollers 31 and 32 simply as idler rollers and also to eliminate idlers 41 and 43. In this latter instance the drive system is illustrated in FIGURE 4 where the pulley 60, serving as an element of a motor-driven speed reduction unit (not shown), has its rotatable shaft 61 coupled by a driving belt 62 to two pulleys 63 and 64 over which such belt is trained, the pulley 63 being mounted on the same shaft 65 with fast capstan 52 and the pulley 64 being mounted on the same shaft 66 with slow capstan 45 so that the peripheral speed of capstan 52 is a fraction of one percent higher than the peripheral speed of capstan 45. In this form, the system reliably performs with only two driven elements above the tape deck 57 with good wow and flutter.

Tests on this drive system indicate that an electrical input of one-half of one watt (½ watt) is adequate to drive one thousand feet (1000′) of one inch (1″) wide, one mil (.001″) thick tape at a recording speed of three and three-quarter inches (3¾″) per second.

It will be evident that a simple reversal in the direction of rotation of pulley 60 suffices to reverse the direction of tape movement. With such reversal, the fast belt capstan 52 (now rotating clockwise in FIGURE 3) is stretching the belt 47 between capstan 52 and slow capstan 45 in the path 54, 55, 44. The resulting tendency towards a higher than normal magnetic tape speed is opposed by a take-up tension now developed between capstan 31 and point 40. Similarly, a drag tension now appears in the magnetic tape section between capstan 32 and point 43 as a result of tape pack belt contraction and the resulting below tape speed of belt 47. The magnetic tape is now being pulled off the right-hand spool in FIGURE 3 at the higher speed established by the tape-drive capstans and this motion is opposed by the slower moving belt 47; and a dynamic equilibrium is reached through the equalizing effect of the magnetic tape tension.

The driving belt 62 is preferably a seamless Mylar belt as is also the tape pack drive belt 47 and the latter is narrower than the magnetic tape 30 and runs over crowned idlers.

The recording tape itself may be wound on a flangeless hub, being prewound under a tension which may be approximately equal to that desired for tape-to-head contact so that successively deeper layers of tape are under increasing compression due to tension in the outer layers. Tape thus wound under tension on a rigid hub can stand very high transverse accelerations without slipping with respect to the hub. The resulting elimination of reel flanges makes possible a more rigid design and does away with possible sources of friction. Center distances between supply and take-up hubs are reduced by reel flange elimination since the diameter of the supply tape pack decreases as the diameter of the take-up tape pack increases, and vice versa.

The arrangement in FIGURES 5 and 6 effects a tension in the tape 80 in the transducer head area between capstans 81 and 82 as the tape moves from the supply reel 83 to the take-up reel 84. The tape 80 travels over four transducer heads 86, 87, 88 and 89 in this area. The magnetic tape path is from the supply reel 83 where it leaves at point 90, around idler roller 91 past the capstan roller 81, across the head area around tape drive capstan 82, past idler roller 93 to the take-up pack at point 94. The path of the elastic belt reel drive which is an endless belt 97 of, for example, Mylar, is from the point 94A on the tape spool, to idler roller 96, around the idler 98, around idler 98A which causes the belt 97 to be wrapped around the capstan roller 95, to the take-up pack at point 99, around the take-up pack past points 100 and 101 where it leaves the take-up pack, to capstan roller 102 and thence back to the supply pack at point 104, around the supply pack to point 105 and return point 94A.

As presently described, the capstans 102, 81, 82, 95 are driven at different peripheral speeds with the peripheral speed of capstan 102 being the lowest, the peripheral speed of capstan 81 being next highest, the peripheral speed of capstan 82 being higher than the peripheral speed of capstan 81 and the peripheral speed of capstan 95 being the highest speed.

Even though the tape section between capstans 82 and 81 is stretched due to the difference in peripheral speeds of capstans 82 and 81, the lineal speed of the recording tape 80 where it crosses the transducer area is constant. The tape pack belt 97 causes a take-up tension in the recording tape between capstan 82 and the point 94 and a dragging or hold-back tension in the recording tape section between capstan 81 and the point 90 where the tape leaves the supply spool.

The arrangement for driving these four capstans is illustrated in FIGURE 6 wherein the driving motor 110 has a shaft 112 for driving the capstan shafts 113, 114, 115, and 116 on which are mounted, respectively, the capstans 81, 82, 95 and 102 through a belt system involving four belts 119, 120, 121 and 122. The belt 119 extends around the motor shaft 112 or a pulley thereon and a pulley 124 on a rotatable shaft 125. The belt 120 couples such shaft 125 with the outer peripheral portion of the three-stepped pulley 127 on shaft 116, the belts 119 and 120 serving essentially for speed reduction purposes. Belt 122 travels over the intermediate pulley portion of pulley 127 and the outer peripheral portion of the two-step pulley 129 mounted on capstan shaft 115. The fourth belt 121 passes, in turn, over the lowest stepped portion of pulley 127, over the pulley 130 on capstan shaft 113, over the smaller peripheral portion of pulley 129, around the pulley 132 on capstan shaft 114, around the idler rollers 134 and 136 to return to the most inward portion of pulley 127. By these means the fast capstan roller 82 has a peripheral speed approximately one-tenth of one percent (.1%) higher than the peripheral speed of capstan roller 81. The tape drive belt 97 is initially prestressed around the tape packs and the amount of such pretensioning may be adjusted, for example, by adjustment of the guide roller 98 on the mounting plate 138. This elastic belt 97, as is also the case in the other elastic tape pack engaging belts described herein, operates within its elastic limits with the belt section between a fast and a slow capstan being stretched and with the belt section between a slow and a fast capstan being allowed to contract by relieving some of the initial forces therein resulting from mounting such belt with an initial prestress.

Instead of having two tape-engaging capstans 81 and 82, the capstan 81 need not be driven and may be in the form of an idler roller or tape guide. In such case, since the tape is moving at a constant linear velocity at all points on the surface of the reels and between reels, the belt sections lying on the tape surfaces move at the velocity of the tape. By means of the belt 97, the supply reel drives the take-up reel as the capstan 82 supplies power to pull tape off its supply reel. Without differentially driving belt 97 little or no tension would be developed in the tape between the reels. However, by driving the belt at capstan 95 at a lineal speed higher than that of the tape at capstan 82 and by driving the belt at capstan 102 at a lower speed than that of the tape at capstan 82, a tension in the tape results, there being sufficient frictional coupling between the belt 97 and capstans 95 and 102 to prevent slippage. The tension developed is substantially proportional to the percentage difference in speed.

The manner in which tape tension is developed may be explained as follows. There is an initial tension in the belt 97. At capstan 95 the belt is being pulled at a speed higher than the tape speed, hence the belt stretches to provide the extra length to allow this extra speed. Between the points 99–100–101 the belt is traveling at tape speed since there is no slippage and the reel is limited in its surface speed by the tape capstan speed. Also, the belt in the path between points 104, 105 and 94A is traveling at tape speed. The difference in tension in the belt section between capstan 95 and point 99 and capstan 102 and points 101, 100 and 99 is balanced by the tension built up in the tape itself between capstan 82 and point 94. From capstan 102 to the point 104, the belt moves slower than the tape because its speed is limited by capstan 102. From the point 104 to 105 and 96A, however, the belt moves at tape speed because the belt is coupled in non-slip relationship to the outer layer of tape and because the tape is being pulled off the reel at tape speed and from capstan 95 to the point 94A, the belt 97 also moves at tape speed. The difference in tension in the belt section between capstan 95 to point 94A and the belt section between capstan 102 and point 104 is balanced by the tension in the tape itself as it is being pulled off the reel at the tape capstan speed. The force required to stretch the belt at capstan 95 is regained at capstan 102 as the belt unstretches, except, of course, for friction and hysteresis losses in the belt.

For driving the tape in reverse, the direction of rotation of all capstans is reversed and in such case the belt section between capstan 95 and point 94A now becomes the stretched belt area and provides take-up tension for reel 83 instead of reel 84; and the belt section between capstan 102 and point 101 becomes the unstretched or partially relieved belt area and provides the differential tensions necessary to produce supply side tape tension.

The tape pack belt changes slightly in length as tape is transferred from supply to take-up reel. The maximum belt path length is required when both reels are of equal diameter. A belt of the same relative elasticity as the web; i.e., modulus of elasticity, may be used when a tensioning device for the belt is provided to allow for belt length change from beginning to end of the reel. For example, when the roller 98 is spring-loaded in accordance with a modification of the present invention, to move in the direction of the arrows 138A then its required difference in belt length is supplied. A polyurethane belt, for example, has sufficient elasticity to eliminate the requirement for a spring-loaded roller. It is not necessary that the belt completely circumscribe the reel and this is demonstrated in connection with the following description.

FIGURES 7, 8, 9 and 10 relate to an arrangement using these differential forces in moving tape and include a mechanical construction that allows convenient removal and replace of the tape spools, supply spool 150 and take-up spool 151, each of which is rotatably mounted on plate 153 with tape 155 passing, in turn, over a guide post 157, between a pressure roller 159 spring-urged towards capstan 160, over staggered transducer heads 162, 163 (one being used for recording and the other for reproducing), between a pressure roller 165 spring-urged towards capstan 166 and over guide post 168 to take-up spool 151.

These capstans 160, 166, dual capstans, each has its corresponding shaft 170, 171 mounting a corresponding pulley 172, 173 driven by a belt 175 trained over the driving pulley 177 on the shaft of motor 180 on the underside of plate 153.

An endless tape pack engaging belt 182 passes, in turn, over a fast capstan 184 to the point 185 where the belt engages the tape pack 150, past point 186 on the tape pack, to point 187 where it leaves the tape pack, over rollers 189, 190 over slow capstan 192, over rollers 194, 196, 198, to the point 199 where it engages the tape pack 151, past the point 200 on the tape pack, to point 201 where it leaves the tape pack and back to the fast capstan 184.

The fast and slow belt capstans 184 and 192, respectively, have corresponding shafts 204 and 205 mounting a corresponding pulley 206, 207 driven by belt 208 trained over the pulley 210 on the shaft of motor 211.

The roller 194, FIGURE 7, a belt tensioning idler, has its shaft 214 slidably mounted in the guide slotted portion 216 in plate 153 with a coil tension spring 217, FIGURE 9, having one of its pins secured to stationary post 219 and the other one of its ends secured to such shaft 214 for normally urging such roller 194 to the left to its position shown in FIGURE 7, thereby tensioning the belt 182.

Means are provided for overcoming the force of spring 217 to cause the roller shaft 214 to slide to the right in guide slot 216 to its position shown in FIGURE 9 where, as shown, the belt 182 is out of engagement with the tape packs 150, 151 which in this case may be wound on standard flanged tape reel and the tape reels may be conveniently removed and replaced without interference from the belt 182. Such means for so positioning the belt 182 involves four pins 222, 223, 224 and 225 engageable with the belt 182 and projecting from a corresponding threaded block 228, 229, 230, 231, FIGURE 8, on a corresponding fully threaded rod 234, 235, 236, 237, these threaded rods having their ends journalled for rotation in stationary spaced bearing pairs 240, 241, 242, 243, respectively, and the pins 222–225 being slidably guided in the parallel extending slotted portions 248, 249, 250, 251, FIGURE 9, respectively, in plate 153. These threaded rods 234, 235, 236, 237 are rotatable simultaneously to progressively advance the group of pins 222–225 from their normal nonbelt-engaging position shown in FIGURE 7 to their position shown in FIGURE 9. For these purposes the threaded rods 248–251 are rotated by a motor-driven pulley system which involves a motor 256, FIGURE 8, mounted on plate 153 and having a pulley 258 on its shaft coupled by belt 259 to one of two pulleys 260 on rod 237, the other pulley 261 being coupled by belt 263 to one of two pulleys 264 on rod 236, the other pulley 266 being coupled by belt 267 to one of two pulleys 268 on rod 235, the other pulley 269 being coupled by belt 270 to pulley 272 on rod 234 such that all rods 234–237 are rotated simultaneously to advance the group of pins 222–225.

Since the rollers 189, 190, 196 and capstan 184 rotate about a corresponding fixed shaft 275, 276, 277, 278 and 204, it will be seen that belt 182 ultimately assumes its position shown in FIGURE 9 where the shaft 214 of roller 194 is in its furthermost right position in FIGURE 9 with the spring 217 further tensioned.

It will be understood that the belt 182 only may be driven or the tape 155 only may be driven, or both the tape and belt may be driven in accomplishing tape movement. Also, the motor 180 driving the dual capstans 160 may be energized only for recording and reproducing purposes with the belt motor 211 being energized only to move the tape forward at a faster speed than used in recording or reproducing; i.e., to obtain a fast-forward function or for purposes of rewinding the tape from the take-up spool to the supply spool in a rewind function; i.e., to obtain a rewind function. In both the rewind and fast-forward function, conventional means may be used simultaneously with energization of the belt drive motor 211 to retract the pressure rollers 159 and 165 so as to allow the tape to move at the higher fast-forward and rewind speeds.

In the arrangements shown in FIGURES 11, 12 and 13, predetermined tension is established in the material between reels and a transfer of a film type material from one reel to another is accomplished with no substantial power input other than that required to overcome frictional losses.

In the driving arrangement shown in FIGURE 11, there is an endless belt 300 circumscribing reels 301 and 302 and also engaging capstans 303 and 304, the peripheral speed of capstan 303 being faster than the peripheral speed of capstan 304; and such belt 300 also travels around guide pins or rollers 306 and 307. The belt 300 is presently assumed to travel in the direction indicated by the arrows and after it leaves the capstan 303 engages the tape pack 302 at 309, passes the point 310 on the tape pack, leaves the tape pack at point 312, travels in turn over the guide pins or rollers 306, 307, passes around the capstan 304, engages the tape pack 301 at point 314, passes the point 316 on the tape pack 301 and leaves it at point 317 to return to capstan 303 about which the belt 300 is wound.

The tape or film material 320 in the form of a web travels from tape pack 302 over two guide pins or rollers 322 and 324 and is wound on tape pack 301. Transducer means (not shown) between the guides may cooperate with the tape and be physically arranged with respect thereto, as exemplified in the other figures and this is also true with respect to FIGURES 12 and 13 where, for purposes of simplicity, a transducer is not shown cooperating with the tapes therein. The belt 300 is preferably more elastic than the film type material 320; i.e., it has a spring rate lower than that of tape 320.

The capstan 303 is mounted on the same shaft with a pulley 326. Capstan 304 is mounted on the same shaft with pulley 328 and a drive belt 329 preferably passes over pulleys 326 and 328, the endless belt 329 being less elastic than belt 300; i.e., belt 329 has a higher spring rate than belt 300.

When the reeled material 320 is moved from reel 301 to reel 302, or vice versa, by means of an external force such as, for example, by applying an external force to rotate roller 322, by applying an external force to either pulley 326 or 328, or by applying an external force to rotate either of the tape packs, or, in general, by applying an external force to a movable element of the system, capstan and pulley combinations 303, 326 and 304, 328 rotate. The relationship between the diameters of capstan 303, pulley 326, capstan 304, and pulley 328 are such that the product of the diameters of capstan 303 and pulley 328 divided by the products of the diameters of capstan 304 and pulley 326 is less than one, thus causing the peripheral velocity of capstan 303 to be slightly higher than the peripheral speed of capstan 304. The exact value of the ratio depends on the tension to be established in tape 320 and the relative spring rates of belt 300, tape 320 and belt 329.

Assuming for the moment, that the path of movement of belt 300 extends counter-clockwise, belt 300 is stretched more in its travel from capstan 304 to capstan 303 than in its travel from capstan 303 to 304 because of the differential peripheral velocity between capstans 303 and 304 and the absence of belt slippage at the capstans. As a consequence, the linear speed of belt 300 is also greater between capstans 304 and 303 than between 303 and 304. Since reel 302 and reel 301 are driven by belt 300, they tend to be driven at the linear speeds of the different belt sections with reel 301 tending to rotate faster than reel 302. The establishment of any difference in reel speeds is resisted by the section of reeled material 320 between reels 301, 302 and a specific tension is developed in such tape section, the exact amount being dependent on the relationships of the differential capstan peripheral velocities and the various elasticities of tape 320, belt 300 and belt 329. This tension is substantially independent of the tape velocity and the diameters of the reels. Nearly all of the energy required at one section of the system is stored in the elastic members and is released at other parts of the system, resulting in substantially zero net power transfer with external power requirement being only that necessary to overcome friction in the system. Since the circumscribing length of the belt 300 changes from the beginning to the end of the reeling operation, the belt 300 is sufficiently elastic to provide for the additional stretch of the idler or guide 307 may be slidably and spring mounted to compensate for such changes.

Reversal of direction of tape movement reverses the direction of rotation of capstans 303 and 304. Due to the previously mentioned geometric relationship, the higher lineal speed section of belt 300 transfers sides and it now tends to drive reel 302 faster than reel 301 to establish again a resisting tension in the tape material.

FIGURE 12 shows an alternate configuration incorporating the same basic principles as the configuration in FIGURE 11 and is more adaptable to cartridge type operation. For convenience in comparison, the comparable elements of FIGURE 12 have the same reference numerals as those in FIGURE 11 but with a letter A appended thereto. It is noted that the arrangement of FIGURE 12 incorporates the same number of belt idlers or rollers, the idlers in FIGURE 12 being related differently with respect to travel of belt 300A.

FIGURE 13 is another modification of FIGURE 11, again incorporating two capstans, each mounted on the same shaft with a corresponding pulley and with a belt passing over the pulleys, and for convenience in comparison the same reference numerals are used with the letter B appended thereto. In this case, the belt 300B extends between the tape packs 301B, 302B with different reaches of the belt between different capstans contacting different tape packs along corresponding paths 309B, 310B, 312B and 314B, 316B, 317B. Using this arrangement, no idler or guide rolls for the belt 300B is necessary.

The arrangement shown in FIGURES 14, 15, 16, 17, 18 and 19 involves a unit 350 having two generally rectangular complementary pan-shaped housing members 351, 352, hinged together about the axis of two coaxial axle members 354, 355 so as to provide a box which may be opened and closed, the closed position being shown in FIGURE 14 and the same FIGURE 18 indicates, in dotted lines, the open position of the housing member 352.

The axle members 354, 355 as shown in FIGURE 15 extend into blind bores in the housing member 351 and are secured therein by a corresponding set screw 356, 357. These axle members 354, 355 rotatably mount a corresponding idler pulley 360, 361 and extend into a corresponding apertured portion in a side wall of housing member 352 for pivotally mounting the housing members, one on the other, to allow the above mentioned opening and closing of unit 350 and to confine these pulleys between the housing members.

The front housing member 352 supports two idler pulleys 363, 364 which correspondingly rotate about an axis coextensive with the axis of capstans 366, 367 on the other housing member 351. Also the housing member 352 is provided with a tape reel post 370 which extends coextensive with the tape reel post 371 on the housing member 351.

A tape pack 375 is on post 370 and a tape pack 376 is on post 371 with the tape 378 extending, in turn, from tape pack 376, over idler pulley 380, FIGURE 15, past transducer heads 381, 382, and over idler pulleys 384 and 385 to the tape pack 375. The idlers 380, transducers 381, 382 and idler pulleys 384 and 385 are mounted on the rear casing half 351.

An endless belt 388 of, for example, Mylar, extends over the capstans and pulleys, as perhaps best illustrated in FIGURE 19, with the belt 388 extending, in turn, from fast capstan 366 to and around idler 360, over idler 363, over a portion of the tape pack 375 (FIGURE 18), over idler 364, over idler 361, over slow capstan 367, over a portion of the tape pack 376 and returning to the fast capstan 366.

As alluded to above, the peripheral speed of fast capstan 366 is slightly greater than the peripheral speed of slow capstan 367, this being accomplished by driving the same by a motor 391, FIGURE 16, through a belt and pulley system which involves a pulley 386, FIGURE 19, on the same shaft as capstan 367, a pulley 387 on the same shaft as capstan 366, a belt 394 passing over the pulleys 386, 387 and a pulley 389 (FIGURE 16) on the same shaft with pulley 387 being driven by a belt 392 passing over the motor shaft 393.

The drive motor 391 is preferably located inside the reel hub centers to conserve space.

A wall of the housing member 351 is apertured at 395 to allow one to see and estimate the amount of tape on the tape packs.

In this stacked reel arrangement, it will be seen that the path of the tape across the transducer heads 381, 382, is skewed at a slight angle with respect to the plane of the tape packs in order to compensate for the stacking height and that a slight twist appears in the tape as it leaves and enters the reel packs to start the skewing angle.

It will be seen from the above that in various arrangements described, external driving force may be applied:

(1) Exclusively to the shafts upon which the belt rollers; i.e., capstans are mounted.

(2) Exclusively to the tape web extending between and connecting the tape packs; or (3) Simultaneously to both the tape web and shafts mounting the belt rollers; i.e., capstans; or (4) To any other movable element to produce tension in such connecting tape web.

The term "Mylar" as used above has, of course, reference to a polyester film produced by E. I. Du Pont de Nemours and Co. Inc. Thus, arrangements described herein have the capability of using materials of substantially the same elasticity for both the tape and the belt.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What we claim is:

1. In a reeling system of the character described, a pair of tape packs with a tape web extending between and connecting said packs, a pair of rollers, an endless elastic pretensioned belt having two sections and extending in substantially non-slip relationship around said rollers with an intermediate portion of each belt section engaging a corresponding one of said pair of tape packs in substantially non-slip relationship and with the peripheral speed of one of the rollers being greater than the peripheral speed of the other of said rollers, each of said rollers being driven externally by a corresponding shaft mounting the corresponding rollers and means for driving each said corresponding shaft.

2. In a reeling system of the character described, a pair of tape packs with a tape web extending between and connecting said packs, a pair of rollers, means for driving said rollers, an endless elastic pretensioned belt having two sections and extending in substantially non-slip relationship around said rollers with an intermediate portion of each belt section engaging a corresponding one of said pair of tape packs in substantially non-slip relationship and with the peripheral speed of one of the rollers being greater than the pheripheral speed of the other of said rollers, said tape web being driven by two capstans, each having the same peripheral speed.

3. In a reeling system of the character described, a pair of tape packs with a tape web extending between and connecting said packs, a pair of rollers, means for driving said rollers, an endless elastic pretensioned belt having two sections and extending in substantially non-slip relationship around said rollers with an intermediate portion of each belt section engaging a corresponding one of said pair of tape packs in substantially non-slip relationship and with the peripheral speed of one of the rollers being greater than the peripheral speed of the other of said rollers, said tape web being engaged and driven by two capstans having different peripheral speeds.

4. In a reeling system of the character described, a pair of tape packs with a tape web extending between and connecting said packs, a pair of rollers, means for driving card rollers an endless elastic pretensioned belt having two sections and extending in substantially non-slip relationship around said rollers with an intermediate portion of each belt section engaging a corresponding one of said pair of tape packs in substantially non-slip relationship and with the peripheral speed of one of the rollers being greater than the peripheral speed of the other of said rollers, said tape web being driven by two capstans having different peripheral speeds, and said rollers being driven at different peripheral speed with the peripheral speeds being such that a roller peripheral speed is the highest, a capstan peripheral speed is lower, the peripheral speed of the other capstan is next lowest, and the peripheral speed of the other roller is the lowest.

5. In a reeling system of the character described, a pair of tape packs with a tape web extending between and connecting said packs, a pair of rollers, an endless elastic pretensioned belt having two sections and extending in substantially non-slip relationship around said rollers with an intermediate portion of each belt section engaging a corresponding one of said pair of tape packs in substantially non-slip relationship and with the peripheral speed of one of the rollers being greater than the peripheral speed of the other of said rollers, the axes of rotation of the tape packs being coextensive, and means for driving each of said pair of rollers.

6. In a reeling system of the character described for reeling tape from one tape pack to another tape pack, a belt extending between two rollers and having different sections thereof travelling at different speed and contacting a correspondingly different tape pack, said tape packs rotating about substantially the same axis, and means driving each of said two rollers at different peripheral speeds.

7. A system as set forth in claim 6, including two mounting members, each rotatably mounting a corresponding one of said tape packs, and means hingedly connecting said mounting members about a hingle axis.

8. A system as set forth in claim 7 in which a pair of belt guide means are mounted coextensive with said hinge axis and over which said belt travels.

9. In a reeling system of the character described for reeling tape from one tape pack to another tape pack, a belt extending between two rollers and having different sections thereof travelling at different speed and contacting a correspondingly different tape pack, means driving each of said rollers at different peripheral speeds, a spring urged member, said belt driving over said spring urged member to tension said belt, and pin means movably mounted to engage different portions of said belt and to move the belt out of engagement with said tape packs against the force of said spring urged member.

10. In a reeling system of the character described for reeling tape from one tape pack to another tape pack, a belt extending between two rollers and having different sections thereof travelling at different speed and contacting a correspondingly different tape pack, means driving each of said two rollers at different peripheral speeds to reel tape from one tape pack to the other tape pack at record and reproduce speeds of said tape, and additional means for driving said rollers at higher and different peripheral speeds to accomplish a reeling of tape at a faster speed than said record and reproduce speeds to accomplish a fast tape rewind function.

11. A reeling system for reeling tape from one tape pack to another tape pack, including a tensioned elastic belt extending between and contacting the periphery of two rollers having different peripheral speeds, said belt having different sections thereof travelling at different speed and each section contacting a different tape pack without any slippage between said belt and said respective tape packs, means for driving said rollers at said different peripheral speeds, said tensioned belt being a source of tensioning force for that portion of the tape which extends between and interconnects said tape packs, said tensioned belt being clear of the tape in all of the areas where said belt contacts said rollers.

12. A reeling system for reeling tape from one tape pack to another tape pack, including a tensioned belt in contact with the periphery of two driven rollers which impart different speeds to different sections thereof with each such section contacting a different one of said tape packs without any slippage between said belt and said repective tape packs, means for driving said rollers at different peripheral speeds, said tensioned belt being clear of the tape in all of the areas where said belt contacts said rollers.

13. In a reeling system of the character described, a first tape pack, a second tape pack, a tape web extending between and interconnecting said tape packs, a belt, a first and a second belt driving roller each having its periphery contacting said belt in nonslip relation, said belt being elastic and being tensioned, means driving said rollers at different peripheral speeds to thereby differentially drive said belt and impart different speeds to different sections thereof, each such section contacting a different tape pack without any slippage between that section and the corresponding tape pack which it contacts and without said belt contacting said tape web which extends between said tape packs.

14. A reeling system including a pair of tape packs with a tape web extending between and connecting said packs, a first roller, a second roller, an endless elastic pretensioned belt having two sections and extending in substantially nonslip relationship around said first and second rollers with an intermediate portion of each belt section engaging a corresponding one of said tape packs in nonslip relationship, means driving each of said first and second rollers such that the peripheral speed of one of said rollers is greater than the peripheral speed of the other of said rollers, said belt comprising the sole driving force for said tape web which extends between and interconnects said tape packs, said belt being clear of the tape in all of the areas where said belt contacts said first and said second rollers.

15. A reeling system including a pair of tape packs with a tape web extending between and connecting said packs, a first roller, a second roller, an endless pretensioned belt having two sections and extending in substantially nonslip relationship around said first and second rollers with an intermediate portion of each belt section engaging a corresponding one of said tape packs in nonslip relationship, means driving each of said first and said second rollers such that the peripheral speed of one of said rollers is greater than the peripheral speed of the other of said rollers, said belt comprising a source of tensioning force for said tape web without said belt contacting any portion of said tape web which extends between said tape packs.

16. A reeling system as set forth in claim 15 in which said belt is of substantially the same elasticity as said tape web.

17. A reeling system as set forth in claim 16 in which the peripheral speed of one of said rollers is only a fraction of a percent higher than the peripheral speed of the other roller.

18. A system as set forth in claim 15 in which said belt circumscribes said tape packs.

19. A system as set forth in claim 15 in which said intermediate portions of said belts each extend through a line which joins the center of rotation of the tape packs.

20. A system as set forth in claim 15 including means for disengaging said belt from said tape packs to allow removal of the tape packs.

21. A system as set forth in claim 15 including additional driving means engaging said tape web and additionally driving said tape web.

22. A system as set forth in claim 15 including means for driving said belt at speeds greater than the record and reproduce speeds of said tape to accomplish a fast tape rewind function.

23. A reeling system as set forth in claim 15 in which said belt is of a polyester film.

24. A reeling system as set forth in claim 15 in which said belt has an elasticity substantially the same as that of said tape.

25. A reeling system as set forth in claim 15 in which said belt travels over a spring-urged member which tensions the belt.

26. A reeling system as set forth in claim 16 in which said belt is a polyester film.

27. In a tape reeling system of the character described, a first tape pack, a second tape pack, a tape web extending between and interconnecting said first and second packs, a belt, a first belt drive roller having its periphery contacting said belt at a first point; a second belt drive roller having its periphery contacting said belt at a second point, a first intermediate portion of said belt extending between said first and second points and contacting a region of said first tape pack without slippage between said belt and said first tape pack, a second intermediate portion of said belt extending between said second and first points and contacting a region of said second tape pack without slippage between said belt and said second tape pack, said belt being under tension, means driving said first roller and said second roller at different peripheral speeds to increase the tension in said first portion and to decrease the tension in said second portion to thereby develop a differential force between ends of said tape web, said belt contacting only said first and second rollers and said first and second packs without contacting said tape web which extends between said tape packs, said tape web being tensioned by said differential force.

28. In a reeling system of the character described, a pair of tape packs with a tape web extending between and connecting said packs, a pair of rollers, an endless elastic pretensioned belt having two sections and extending in substantially non-slip relationship around said rollers with an intermediate portion of said belt section engaging a corresponding one of said pair of tape packs in substantially non-slip relationship and with the peripheral speed of one of the rollers being greater than the peripheral speed of the other of said rollers, and means for applying a force to said tape for driving said rollers, said belt comprising a source of tensioning force for said tape web without said belt contacting any portion of said tape web which extends between said tape packs.

29. In a reeling system of the character described, a pair of tape packs with a tape web extending between and connecting said packs, a pair of rollers, an endless elastic pretensioned belt having two sections and extending in substantially non-slip relationship around said rollers with an intermediate portion of each belt section engaging a corresponding one of said pair of tape packs in substantially non-slip relationship and with the peripheral speed of one of the rollers being greater than the peripheral speed of the other of said rollers, a shaft, a first pulley on said shaft, one of said rollers being mounted on said shaft, a second shaft, a second pulley mounted on said second shaft, the other one of said rollers being mounted on said second shaft, a second belt travelling over said first and second pulleys, the product of the diameters of said one roller and said second pulley divided by the product of the diameters of said other roller and said one roller being a ratio which is less than one, and means for driving said second belt, the first-mentioned belt comprising a source of tensioning force for said tape web without said first-mentioned belt contacting any portion of said tape web which extends between said tape packs.

References Cited by the Examiner

UNITED STATES PATENTS

| | | | |
|---|---|---|---|
| 2,658,398 | 11/1953 | Masterson | 242—55.14 X |
| 3,083,925 | 4/1963 | Schoebel | 242—55.13 |
| 3,114,512 | 12/1963 | Peshel et al. | 242—55.12 |
| 3,125,311 | 3/1964 | Willis | 242—55.14 |

FOREIGN PATENTS

| | | |
|---|---|---|
| 751,075 | 12/1952 | Germany. |
| 687,927 | 2/1953 | Great Britain. |

FRANK J. COHEN, *Primary Examiner.*

MERVIN STEIN, STANLEY N. GILREATH, *Examiners.*

G. F. MAUTZ, *Assistant Examiner.*